US010719430B2

(12) United States Patent
Tang et al.

(10) Patent No.: US 10,719,430 B2
(45) Date of Patent: Jul. 21, 2020

(54) SKETCH-GUIDED GUI TEST GENERATION FOR MOBILE APPLICATIONS

(71) Applicant: Nanjing University, Nanjing (CN)

(72) Inventors: Enyi Tang, Nanjing (CN); Linzhang Wang, Nanjing (CN); Chucheng Zhang, Nanjing (CN); Haoliang Cheng, Nanjing (CN); Xin Chen, Nanjing (CN); Xuandong Li, Nanjing (CN)

(73) Assignee: NANJING UNIVERSITY, Najing Shu, Jiangsu Shong (CN)

( * ) Notice: Subject to any disclaimer, the term of this patent is extended or adjusted under 35 U.S.C. 154(b) by 179 days.

(21) Appl. No.: 15/949,377

(22) Filed: Apr. 10, 2018

(65) Prior Publication Data

US 2018/0373621 A1    Dec. 27, 2018

Related U.S. Application Data

(60) Provisional application No. 62/524,781, filed on Jun. 26, 2017.

(51) Int. Cl.
| G06F 11/00 | (2006.01) |
| G06F 11/36 | (2006.01) |
| G06F 3/0488 | (2013.01) |
| G06F 3/0481 | (2013.01) |
| G06F 3/0486 | (2013.01) |

(52) U.S. Cl.
CPC ........ *G06F 11/3688* (2013.01); *G06F 3/0488* (2013.01); *G06F 3/04883* (2013.01); *G06F 11/3672* (2013.01); *G06F 11/3684* (2013.01); *G06F 3/0486* (2013.01); *G06F 3/04812* (2013.01)

(58) Field of Classification Search
CPC ............ G06F 11/3688; G06F 11/3672; G06F 11/3684
See application file for complete search history.

(56) References Cited

U.S. PATENT DOCUMENTS

| 5,534,893 A | * | 7/1996 | Hansen, Jr. | ......... G06F 3/04883 178/19.01 |
| 9,740,381 B1 | * | 8/2017 | Chaudhri | ................ G06T 13/80 |

(Continued)

FOREIGN PATENT DOCUMENTS

| CN | 1321954 A | * | 11/2001 | |
| EP | 0095536 A1 | * | 12/1983 | ............. G09G 5/246 |
| KR | 20140059600 A | * | 5/2014 | |

*Primary Examiner* — Katherine Lin
(74) *Attorney, Agent, or Firm* — Duane Morris LLC (57) ABSTRACT

A testing system for testing a touch screen graphical user interface is disclosed. The testing system includes a touch screen for displaying the graphical user interface under test and for receiving a first plurality of touch inputs from at least one user, a first module for recognizing the first plurality of touch inputs received by the touch screen as a second plurality of data structures, a second module for receiving the second plurality of data structures from the first module and constructing at least one test model, a third module for generating a third plurality of test cases based on the at least one test model constructed by the second module, and a fourth module for executing the third plurality of test cases generated by the third module.

28 Claims, 11 Drawing Sheets

(B) strokes for testing (56) References Cited

U.S. PATENT DOCUMENTS

| | | | |
|---|---|---|---|
| 2015/0081598 A1* | 3/2015 | Depizzol | G06F 11/3664 |
| | | | 706/12 |
| 2015/0301724 A1* | 10/2015 | Thibadeau, Sr. | G06F 3/04842 |
| | | | 706/12 |
| 2015/0339217 A1* | 11/2015 | Avgerinos | G06F 11/3608 |
| | | | 717/132 |
| 2018/0070909 A1* | 3/2018 | Kravis | G01R 33/02 |

* cited by examiner (B) strokes for testing

FIG. 1B (A) a bird shooting action

| Algorithm 1 Strokes Recognition Algorithm |
|---|
| Input: $str$ <br> Output: $\sigma, \pi$ |
| 1: $\Delta k \leftarrow str$ <br> 2: $\pi \leftarrow str$ <br> 3: $n =$ numbers of the slope change <br> 4: if $\Gamma(n, \Delta k)$ then <br> 5: $\quad \sigma =$ concrete action <br> 6: end if <br> 7: return $\sigma, \pi$ |

Table 1

FIG. 9

| Algorithm 2 Model Building for Atomic Operation |
|---|
| Input: $S, s_0 \in S, \sigma \in \Phi, \pi$ |
| Output: $M = <\Sigma_{new}, S_{new}, I, \delta>$ |
| 1: $\Sigma_{new} \leftarrow \emptyset, S_{new} \leftarrow S, \delta \leftarrow \emptyset$ |
| 2: $I = s_0$ |
| 3: $s'_0 = <s_0, \sigma, \pi>$ |
| 4: if $s'_0 \notin S_{new}$ then |
| 5:     $S_{new} \leftarrow S_{new} \cup \{s'_0\}$ |
| 6: end if |
| 7: if $\sigma \notin \Sigma_{new}$ then |
| 8:     $\Sigma_{new} \leftarrow \Sigma_{new} \cup \sigma$ |
| 9: end if |
| 10: $t = <s_0, \sigma, s'_0>$ |
| 11: $\delta = \delta \cup \{t\}$ |
| 12: $M = <\Sigma_{new}, S_{new}, I, \delta>$ |

Table 2

FIG. 10

Algorithm 3 Model Building for Joint Operation

Input: $S, s_0 \in S, \tau = <\sigma_1, \sigma_2> \in \Psi \times \Phi$
Output: The model $M = <S_{new}, I, T>$ 1: $S_{new} \leftarrow S, T \leftarrow \emptyset$
2: $I = s_0$
3: for each widget in $s_0$ do
4: $\quad M_{mid} = atomic\_model(S, s_0, \sigma_2)$
5: $\quad M = M \cup M_{mid}$
6: end for

Table 3

FIG. 11

SKETCH-GUIDED GUI TEST GENERATION FOR MOBILE APPLICATIONS

CROSS-REFERENCE TO RELATED APPLICATION

The present application claims priority to U.S. Provisional Patent Application No. 62/524,781, filed on Jun. 26, 2017, which is incorporated by reference herein in its entirety.

BACKGROUND

Mobile applications with more and more complex graphical user interfaces (GUI) are very popular in the application market today. Test cases which include sequences of user actions and events are usually generated manually to test the GUI's. For example, test scripts are written manually line by line and user actions are recorded case by case. These manual operations are often times tedious and inefficient. Even worse, such manual test generation approaches lack a description of the high-level testing model which explicitly expresses testing purposes during the test generation process. GUI test case generation guided by sketching is a novel approach, in which the testers draw strokes on the screen-shots of a mobile application to specify their testing purpose. Then such strokes are identified automatically and constructed into test models, such as Image Based Finite State Machine (IFSM) model. GUI test cases can be generated systematically based on this model. Testers can further improve their test by sketching more strokes on-the-fly if necessary.

As graphical user interfaces have characteristics different from traditional enterprise software, techniques in testing GUI present different challenges and requirements. In the field of mobile application test generation, the state-of-the-art test generation techniques are classified into four categories: random-walk testing, systematic testing, model-based testing and model-learning testing. Random-walk testing, such as Monkey and Dynodroid, generates random sequences of user events to the application under test (AUT). Testing is conducted without any consideration of the actual widgets displayed on the screen, the actual test actions and areas being clicked. Systematic testing, such as Acteve, tests the applications systematically based on symbolic execution technique. It usually collects information from the AUT and combine such information with dynamic symbolic execution technique to generate input events to test mobile applications. Model-based testing, such as MobiGUITAR (a.k.a. AndriodRipper), TEMA, ORBIT and SlumDroid, requires the model of the AUT to generate inputs. The model is usually provided by the tester or obtained by observing and crawling the information of the AUT. Model-learning testing, such as SwiftHand, does not require a complete test model to be provided before the test. Instead, it infers and gains the model on-the-fly while the AUT is under testing. Most existing test generation techniques perform tests either in great reliance on tester's manual efforts, or completely without of tester's control. The manual test, or partial manual test, tends to be expensive in practice. For example, MonkeyRunner requires test scripts to be written by tester manually. Writing scripts manually is a very labor-intensive process, tedious and fallible, and the test cases are often ineffective. TEMA's creation of models also relies on intensive manual work. It requires smaller AUT model components from the tester in order to generate full test model in a parallel composition process. In the automatic test generation process, the entire testing process becomes fully automated without human intervention. Examples of such tools include Monkey, SwiftHand, GUIRipper and A2T 2, etc. Automatic test generation presents new challenges. For example, random-walk testing usually play the entire testing process blindly which results in inefficiencies, systematic testing is often at risk of path explosion, model-based testing and model-learning testing are also affected by state space explosion.

Testing with human intervention will resolve the issues above by combining human tester's powerful intelligence and the machine's enormous computing power. For example, Dynodroid allows interleaving of events from the machine and events from human testers to reach higher source code coverage with fewer test cases. AndroidRipper allows testers to select a sub model manually to avoid state space explosion and generate more accurate test cases in the test generation period. Due to the limitation of the methods themselves, human testers' role is not optimized.

It not only makes tester have a low participation, but also be short of intuition. For example, for the existing model-based test generation techniques, their models often are lack of sufficient expressivity to convey the actual test purpose of tester. Therefore, to tackle these predicaments, we propose a novel sketch-guided test generation technique. A key insight of our approach is to design a practical method to help testers express their test purpose easier and more intuitive. We design an intuitive way to assist testers in expressing their good testing ideas. At the same time, we present an enhanced model called Image-based and Logic-related State Transition Systems (ILSTS) based on state machines, specifically labeled state transition systems (LSTS). By combining human intelligence and ILSTS together, tester can exercise the mobile application more accurate and more targeted. Let's take a look at our test model. In short, in order to show the logical relationship between every different state in one test case, we introduce the first order logic predicates into our test model. For example, the first-order logic predicate $\forall$, $\exists$ can be expressed in our model, they can be used as test generation strategy to guide generation work. For our approach, ILSTS brings a more powerful expression ability that can help tester detect more types of bugs. For testers, our approach allows tester generate more accurate test model by sketching. It helps testers (or users) do their testing tasks more visualized and efficient. As mobile devices are extremely convenient in sketching by fingers, testers just need to simply draw a few strokes on the screen to specify their testing purposes. Our framework automatically recognizes these sketches, systematically generates the sequences of events to test AUT based on tester's actual testing purposes. The sketching-based approach extremely alleviate the cost of mobile GUI-based application testing, and generates test cases highly consistent to the intention of users.

Figure 1A:
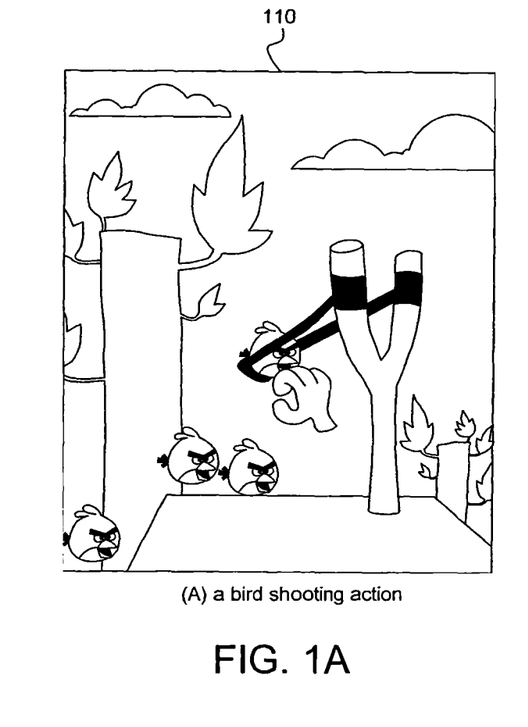
FIG. 1A is a screenshot of a graphical user interface on a touch screen, in accordance with some embodiments.

FIG. 1A is a screenshot of a graphical user interface on a touch screen, in accordance with some embodiments. The Angry Bird game is used as an example, but the following discussion applies to all other games and applications on a touch screen. In the Angry Bird game, the player shoot birds with different angle and strength in order to destroy pigs and other objects. The screenshot 110 shows an action of shooting by dragging a bird on a slingshot with a specific angle and distance. Different angles and distances result in varying scores in the game. In order to generate high score GUI inputs, the tester needs to specify as many angle and distance patterns as possible and make multiple trials. In traditional test approaches, all of these cases either need to be specified in test scripts manually, or need to be selected by a suitable sub model with significant amounts of labor.

Figure 1B:
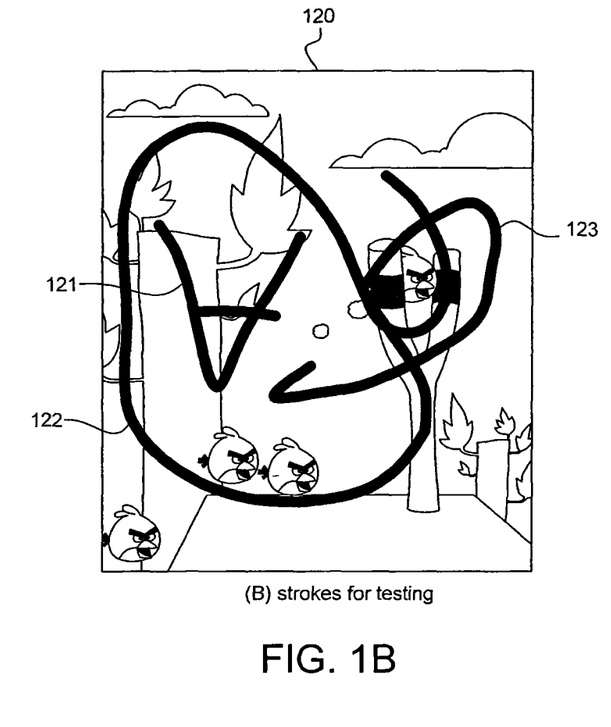
FIG. 1B is an illustration of strokes for testing on the touch screen graphical user interface, in accordance with some embodiments.

FIG. 1B is an illustration of strokes for testing on the touch screen graphical user interface, in accordance with some embodiments. In comparison to manual testing, under the sketch-guided framework, the tester draws test strokes on the touch screen to perform the test. The screen shot 120 is the GUI of the game in FIG. 1A overlapped with strokes 121, 122 and 123. The strokes are range, logic and action strokes respectively. The details of the range, logic and action strokes will be discussed in details in the paragraphs below. The strokes on the screen provide input to the test system to generate a dragging action starting from the bird on the slingshot and ending at a location in the range specified by the stroke. The stroke 121 in the shape of ∀ is an example of a logic stroke, and the stroke 122 is an example of range stroke. The test system maintains a corresponding universal quantifier constraint as test generation criterion to guide test case generation. The test system automatically produces as many test inputs as possible and the end points of every drag test is in the range defined by the range stroke.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 2:
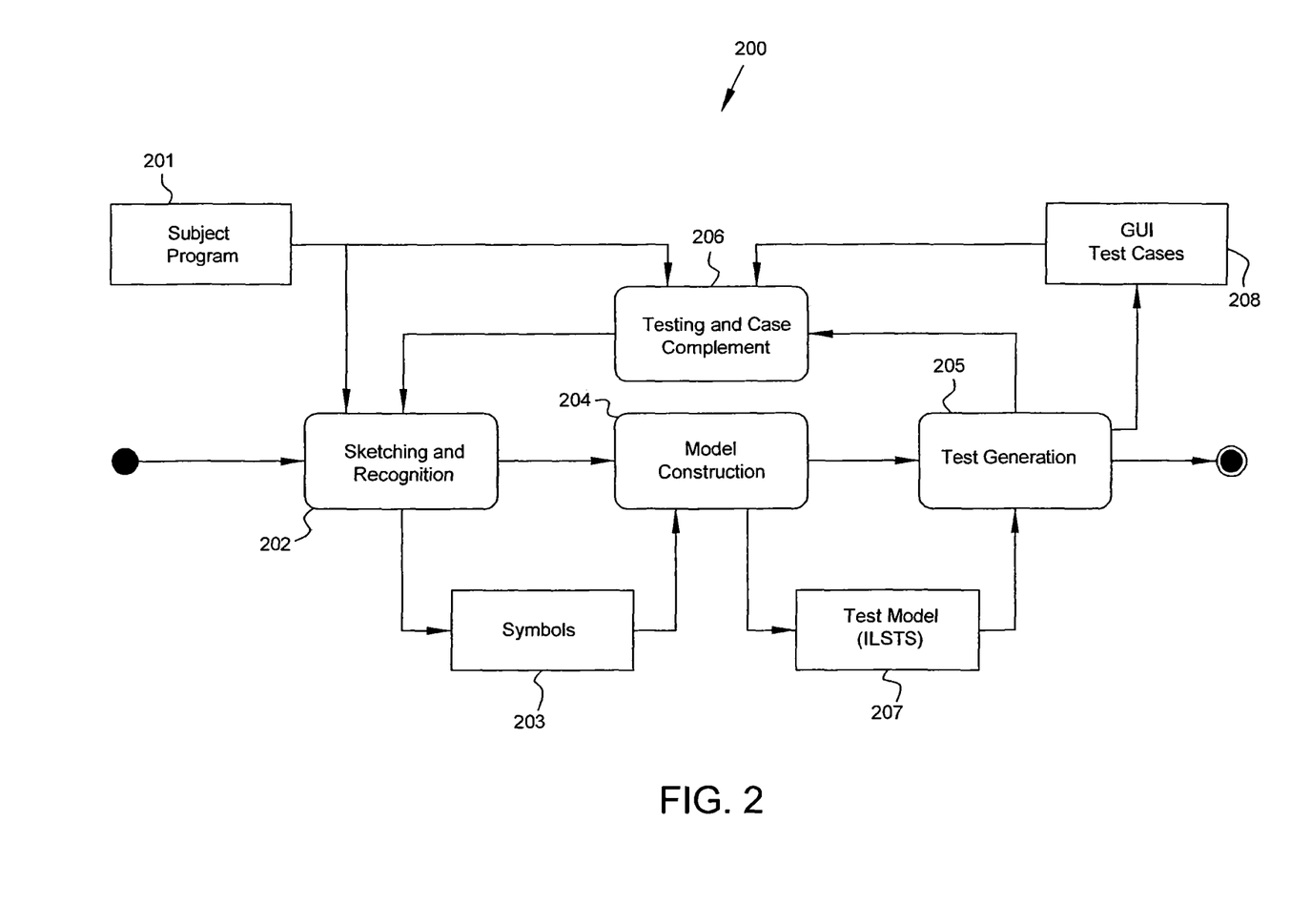
FIG. 2 is a schematic illustration of the sketch-guided GUI testing system, in accordance with some embodiments.

FIG. 2 is a schematic illustration of the sketch-guided GUI testing system, in accordance with some embodiments. The sketch-guided GUI testing system 200 includes four key modules: the sketching and recognition module 202, the model construction module 204, the test generation module 205 and the testing and case complement module 206. According to some embodiments, the subject program 201 is the mobile application under test. According to some embodiments, the subject program 201 is provided to the sketching and recognition module 202. According to some embodiments, the testers implement test ideas with strokes such as those discussed in FIG. 1B. Then the sketching and recognition module 202 automatically translates the strokes into a plurality of data structures, which are transmitted to the next model construction module 204 as the inputs. According to some embodiments, the model is Image-based Logic-related State Transition System (ILSTS) which will be discussed in more details below. The test generation module 205 performs specific strategy of the ILSTS model to generate test cases implementing the tester's testing strategies.

According to some embodiments, test case generation strategies include depth-first traversal, width-first traversal, unexplored-first exploration, random selection. According to some embodiments, the testing and case complement module 206 implements the test case on touch screen devices, such as Android devices, or virtual devices to perform subject program testing. According to some embodiments, when there are any new test requirements, such as a new interesting and important subprograms or some additional testing tasks, during the subject program 201 testing process, the system 200 provides feedback circle in order to help tester complement more test cases. According to some embodiments, when a previously untested (un-sketched) application graphic interface arises, it can be selected by tester to take a further testing. Similarly, the further testing is also based on our sketch-guided approach.

Figure 3:
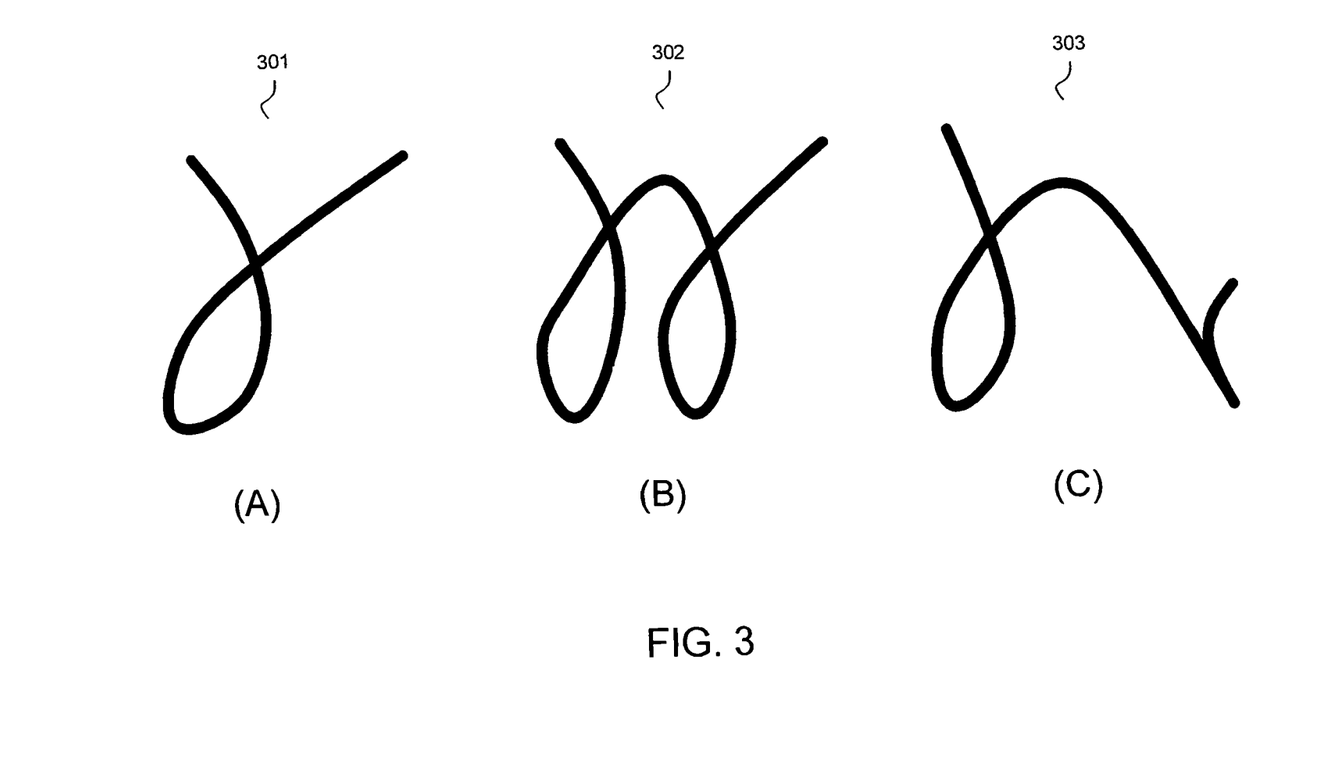
FIG. 3 is a schematic illustration of three action strokes, in accordance with some embodiments.

FIG. 3 is a schematic illustration of three action strokes, in accordance with some embodiments. According to some embodiments, test strokes are overlapped on the top of screen shots of a GUI which contains the subject program 201's graphical elements under test. According to some embodiments, the test strokes are translated corresponding data structures.

Figure 5:
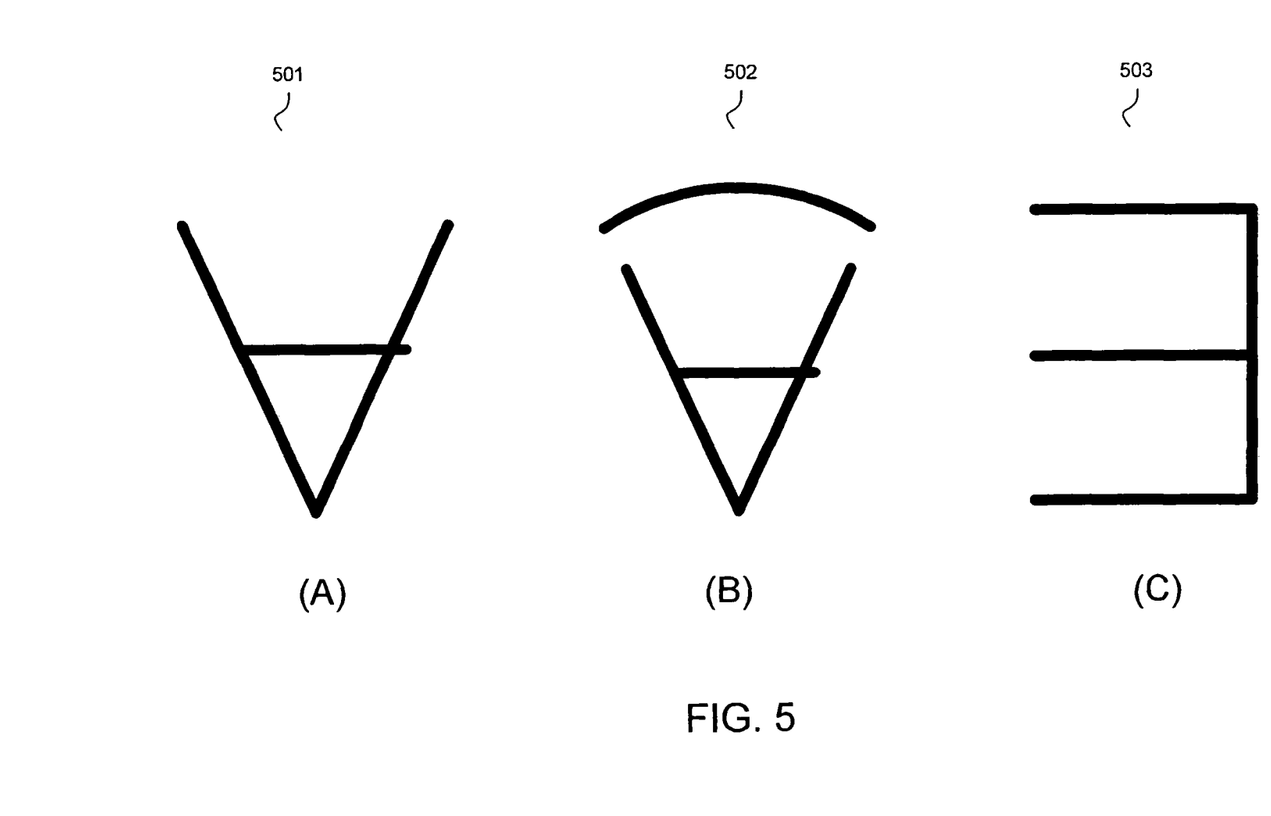
FIG. 5 is a schematic illustration of three quantifier constraint logic strokes, in accordance with some embodiments.
Figure 6:
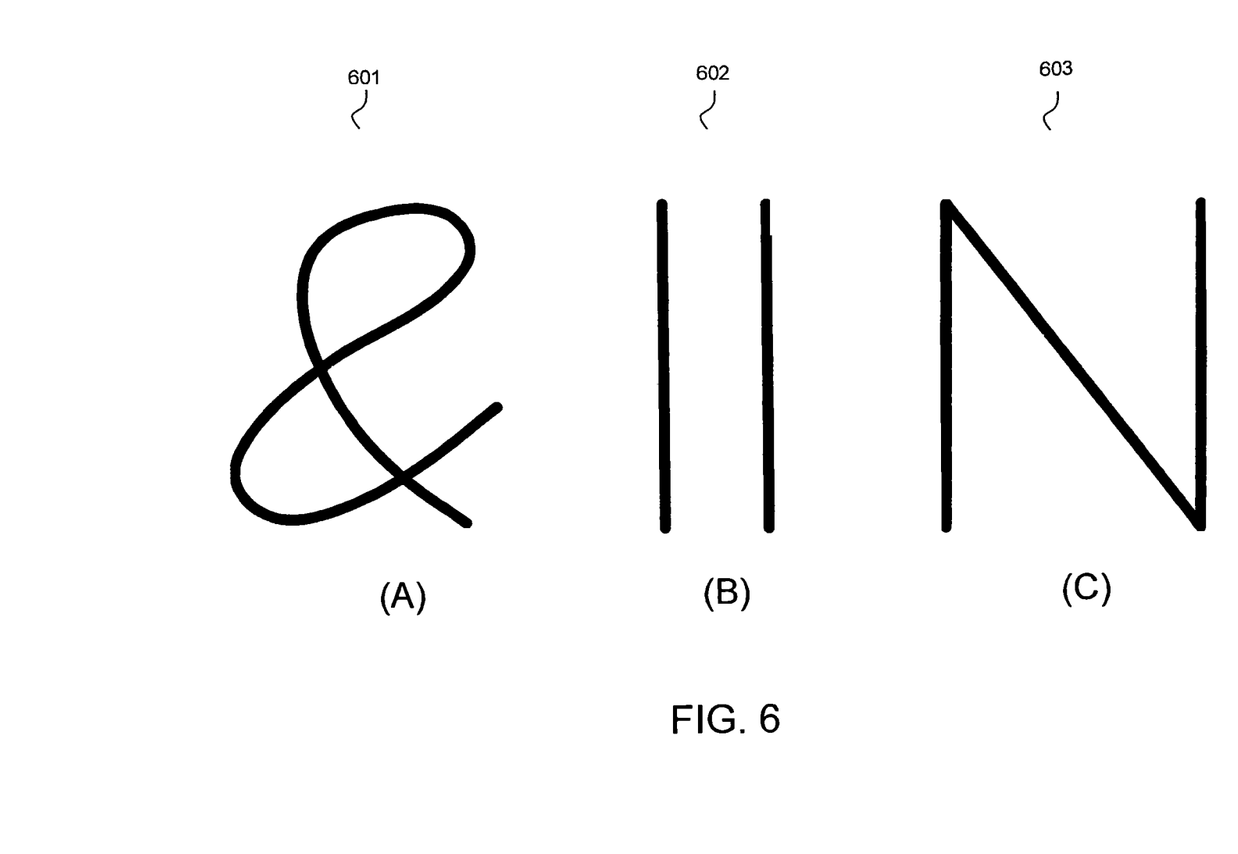
FIG. 6 is a schematic illustration of logical logic strokes, in accordance with some embodiments.

According to some embodiments, three major types of stokes: action stroke, logic strokes, and range strokes. Action strokes represents test actions, such as click 301, long click 302 and drag 303, which are atomic and inseparable. Logic strokes are implemented for describing the logical relationships, such as AND 601, OR 602 and NOT 603, or constraint rules, such as universal quantifier constraint forall ∀ 501, recursive forall 502 and existential quantifier constraint for some ∃ 503. They are also atomic and can be applied to the test model to strengthen the expressive ability of model.

Range strokes represents a test area which is selected by testers. According to some embodiments, the range strokes are combined with the other two types of strokes to express the relationship between the different elements inside the selected area. According to some embodiments, a suitable testing model is built by the combination of these three types strokes.

According to some embodiments, 301 represents a click operation whose location is determined by the position of 301C. When 301 is drawn then a click test action is performed on the widget located at 301C. For example, if the center of the stroke 301C sits on a button widget, the button is clicked once. Similarly, the stroke 302 represents a long-lick operation and 303 represents a drag operation. According to some embodiments, the direction of the stroke 303's tail 303T represents the direction of the drag operation and the end point 303E of the tail 303T represents the end point of this drag operation. According to some embodiments, the operations 301, 302 and 303 are all basic atomic test actions, in the subsequent stages, they can be modeled as concrete actions (arcs) between the states in the testing model.

Figure 4:
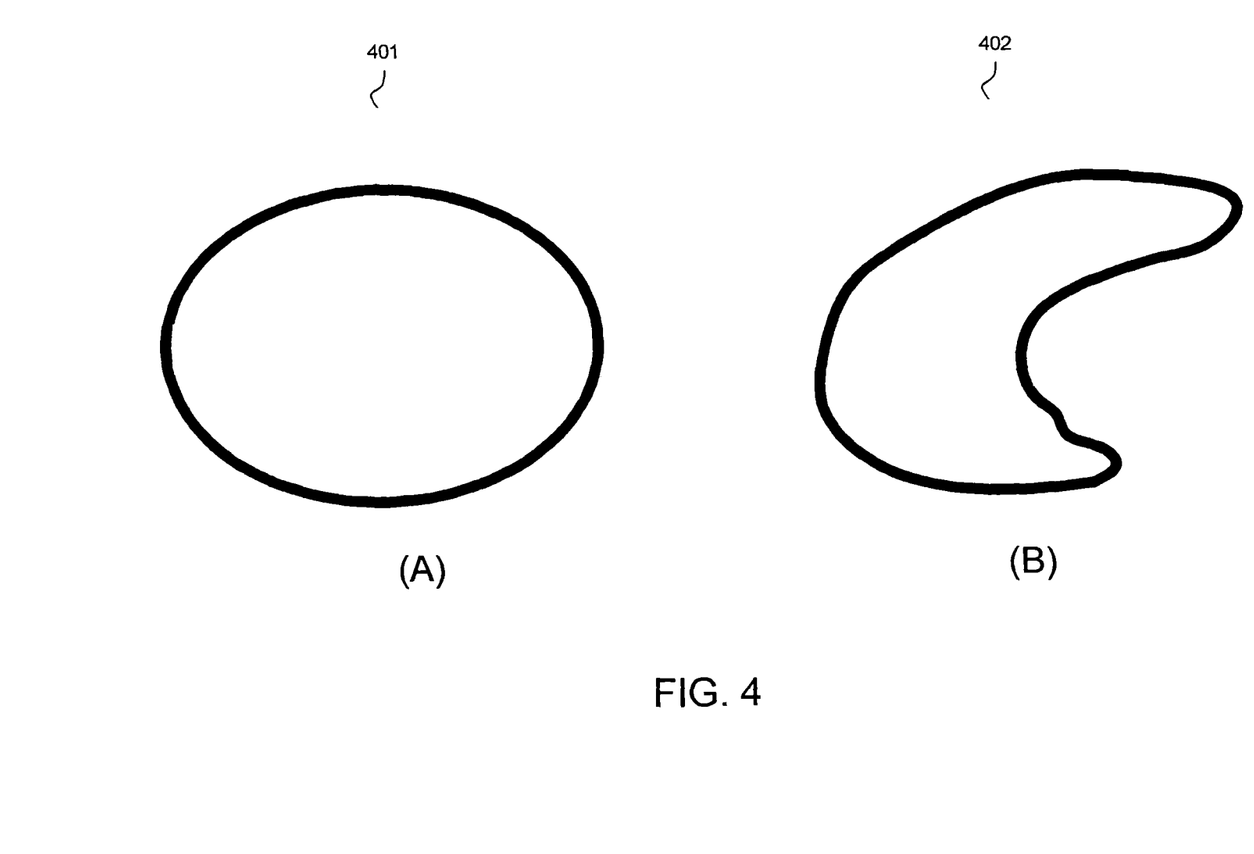
FIG. 4 is a schematic illustration of two range strokes, in accordance with some embodiments.

FIG. 4 is a schematic illustration of two range strokes, in accordance with some embodiments. According to some embodiments, for range strokes, closed curves 401 and 402 on the specified screenshot are drawn to select a focused testing area. Based on the areas defined by strokes 401 and 402, sets of test elements can be selected. According to some embodiments, the range strokes and the logic strokes are combined to express specific test semantics. According to some embodiments, there are two major categories of range strokes: one is the regular curve, such as circle, ellipse, polygon, etc. The other is the irregular curve, such as other random curves. According to some embodiments, in FIG. 4, 401 is a regular curve and 402 is an irregular curve.

According to some embodiments, there are two major classes of logic strokes: the quantifier constraint symbols which express the specific semantic within the given range, and the logical relationship symbols which show the specific relationship between the given elements. FIG. 5 is a schematic illustration of three quantifier constraint logic strokes, in accordance with some embodiments. FIG. 6 is a schematic illustration of logical relationship strokes, in accordance with some embodiments.

According to some embodiments, FIG. 5 illustrates three basic quantifier constraint strokes, the stroke 501 is forall constraint ∀, the stroke 502 is recursive forall constraint $\hat{\forall}$ and the stroke 503 is forsome constraint ∃. The forall constraint stroke 501 implies all the widgets (or elements) under the constraint must be tested. According to some embodiments, if a new child widget appears during testing, no further test operation needs to be conducted. According to some embodiments, the recursive forall constraint stroke 502 is a stronger constraint which requires not only the widgets under constraint need to be tested, but the new child widgets appeared during testing also need to be tested recursively. According to some embodiments, the forsome constraint stroke 503 is a weaker constraint condition. For the set of widget under this constraint, only one element needs to be selected for the test operation based on selection conditions.

FIG. 6 is a schematic illustration of logical relationship strokes, in accordance with some embodiments. According to some embodiments, there are three basic logical relationship strokes, 601, 602 and 603. Several elements constrained by the AND relation stroke 601 stands for the same behavior (or state) should be satisfied simultaneously. The OR relation stroke 602 represents that there is at least one element which meets the specific behavior. The NOT relation stroke 603 is a unary constraint, which means that the only element must not satisfy the behavior.

According to some embodiments, various testing can be achieved through the combination of these three types of primary strokes. For example, the combination of range stroke and logic stroke can be implemented to express the constraint relation between the elements within their designated areas. For example, a forall constraint ∀ stroke 501 inside a regular elliptic closed range stroke 401 represents the test sematic that all of the widgets inside the elliptic curve need to be tested automatically. For example, all of the buttons within the range stroke 401 need to be clicked, all of the input text fields within the range stroke 401 need to be filled out. Similarly, according to some embodiments, the combination of action strokes and range strokes represents that all of the elements within the range stroke should be tested by a specific test action. According to some embodiments, the forall constraint stroke 501 is the default. According to some embodiments, due to the vague test semantics, the combination of action strokes and logic strokes are not implemented. According to some embodiments, the rules of combination are modeled as a series of basic test models based on the state machine:

quantifier_logic::=forall|rec_forall|exist
logical_logic::=and|or|not
logic::=quantifier_logic|logical_logic
range::=range|range logic|regular|irregular
action::=action|action range|click|long_click|drag According to some embodiments, various testing purposes can be expressed through the description of the strokes and their combination rules.

According to some embodiments, the purpose of stroke recognition is to recognize accurate symbols, including the test operations and widgets. According to some embodiments, the sketched strokes str is recognized based on the changes of gradient, denoted by Δk. The strokes are sampled to obtain a series of discrete points. For android view, the origin is located in the upper-left corner of the screen. The gradient k between every two adjacent discrete points can be calculated. The action σ can be recognized based on the unique characteristic of the strokes. The process from strokes to actions can be denoted by a function Γ.

Figure 9:
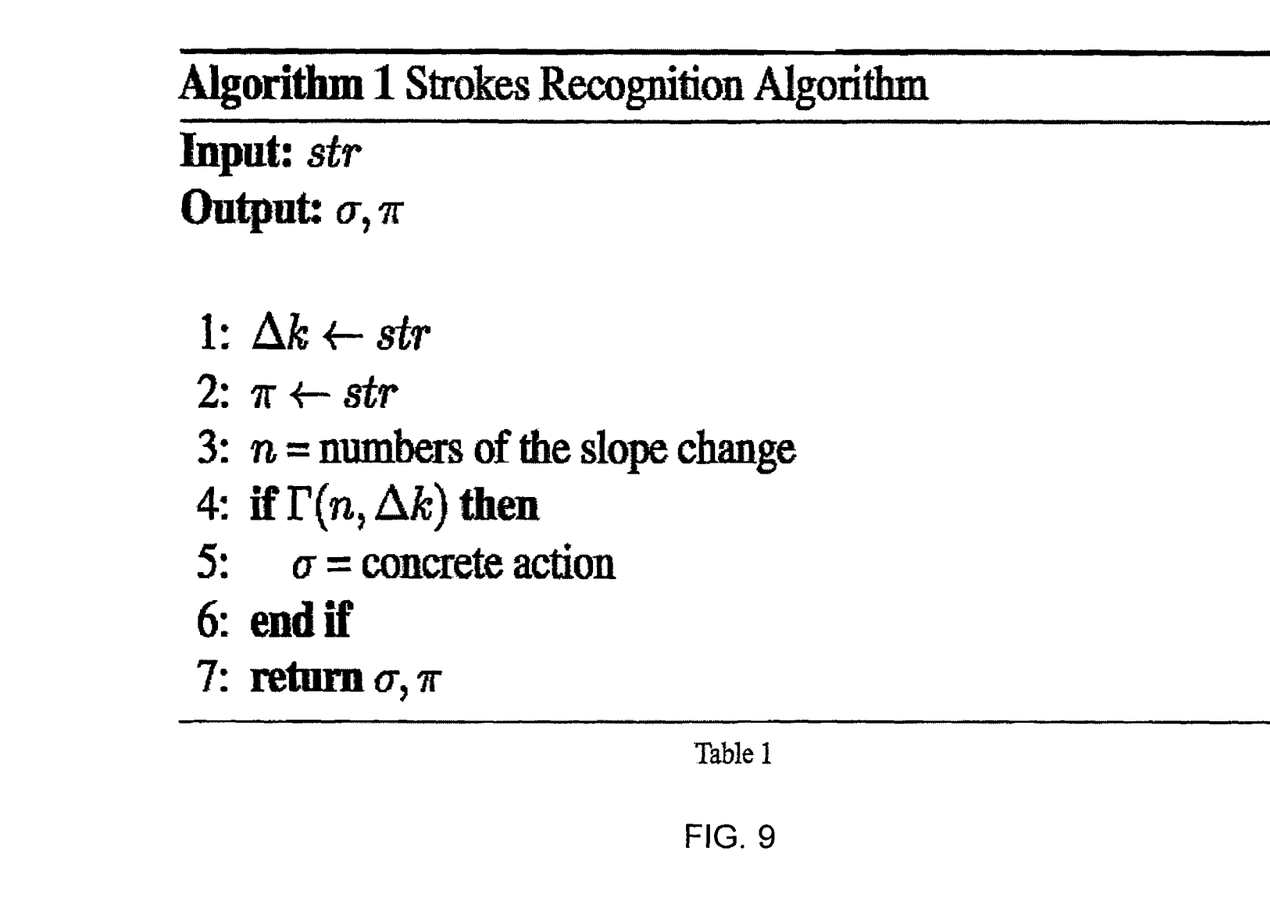
FIG. 9 shows Table 1 that lists Algorithm 1 which is the strokes recognition algorithm.

According to some embodiments, the slope of click stroke 301 changes exactly once from positive to negative. The slope of long click stroke 302 changes from positive to negative twice. For the drag stroke 303, there is a dramatic slope change at the end of this stroke. For slide stroke, the slope in its tail part remains invariable. According to some embodiments, the action set of the action strokes is denoted by Φ, the action set of range strokes is denoted by Ω. For constraint strokes, there are restriction effect on the whole test process, the action set is denoted by Ψ. According to some embodiments, there is σ ∈ Φ ∪ Ω ∪ Ψ. In addition, the pixel position for each stroke also needs to be recorded which tells the specific widget that the test action is performed on. The widget is denoted by $\pi$. According to some embodiments, the recognition process is shown in Algorithm 1 in Table 1.

Figure 7:
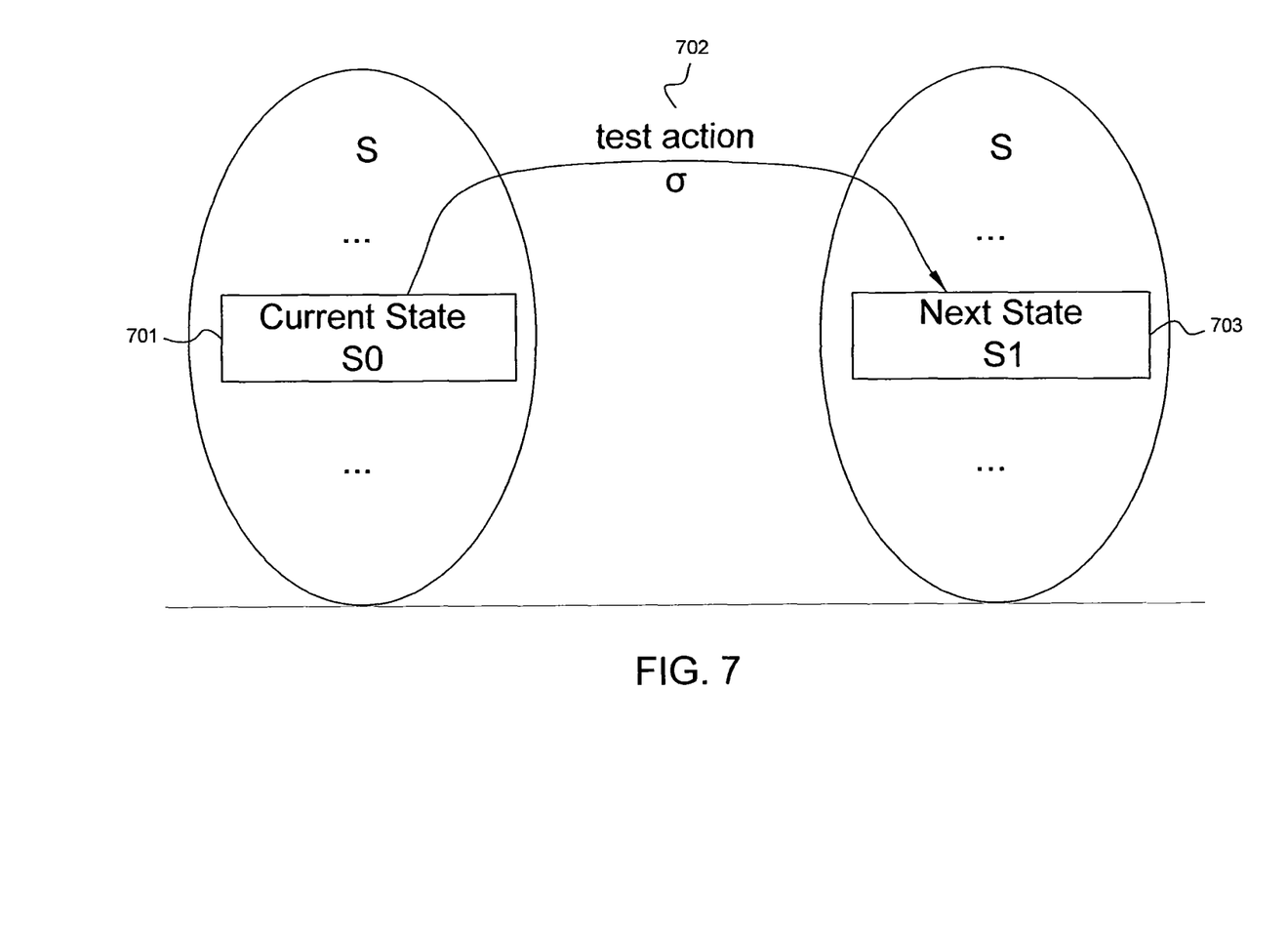
FIG. 7 is a schematic illustration of the transition function, in accordance with some embodiments.

FIG. 7 is a schematic illustration of the transition function, in accordance with some embodiments. According to some embodiments, the Image-based Finite State Machine (IFSM) is implemented to model the test modules. The IFSM is a variant of finite state machine and can be described as a quad $<\Sigma, S, s_0, \delta>$, where $\Sigma$ is the set of concrete test actions, S is the set of states. According to some embodiments, the state is the screenshots of SUT. $S_0$ represents the initial state, which is equivalent to the initial screenshot. $\delta$ represents a transition function $\delta: S \times \Sigma \rightarrow S$. According to some embodiments, there is no evidence of final state for IFSM because every state can be viewed as an accept state.

Figure 8:
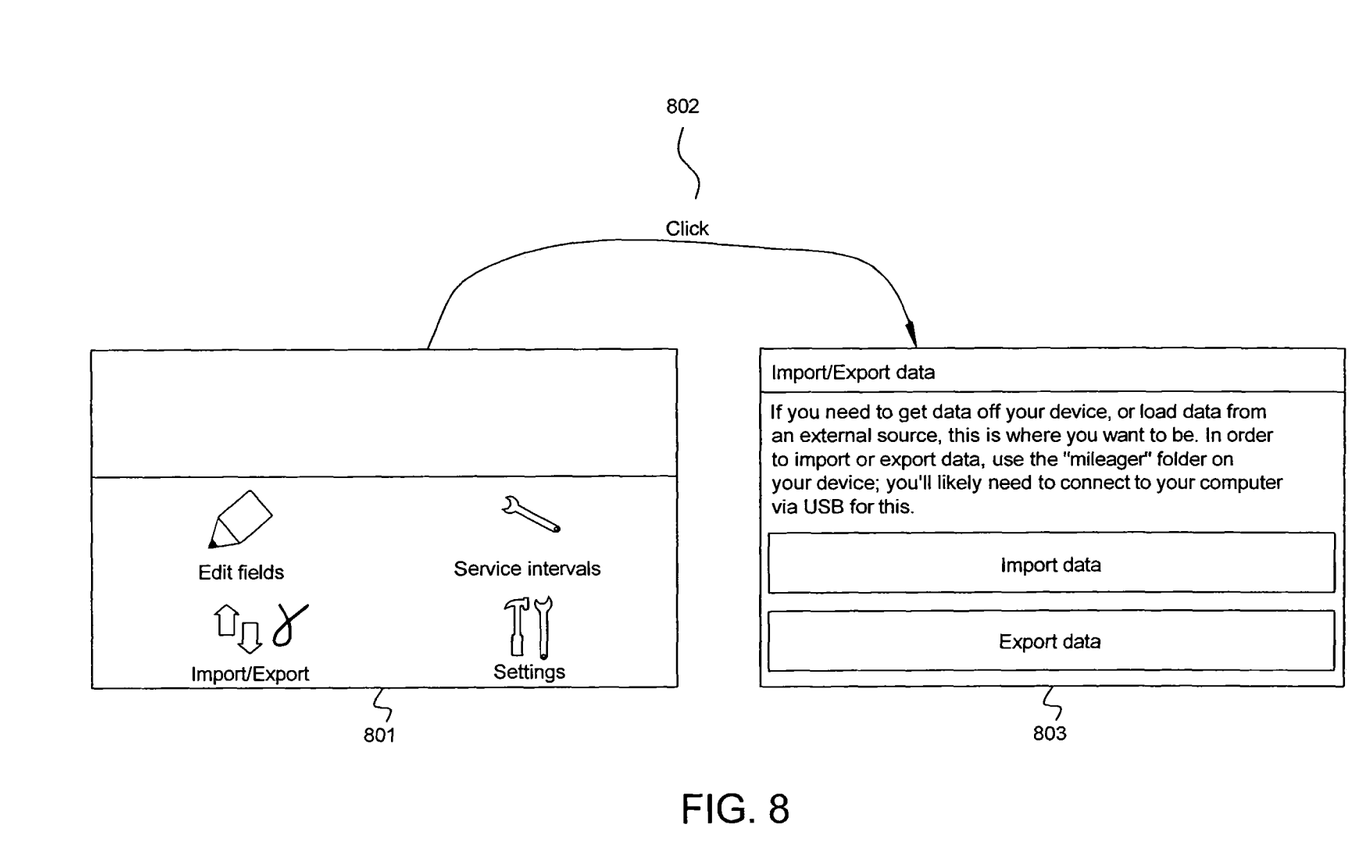
FIG. 8 is schematic illustration of an example of the transition function in IFSM, in accordance with some embodiments.

FIG. 8 is schematic illustration of an example of the transition function in IFSM, in accordance with some embodiments. According to some embodiments, click stroke is drawn on the Import/Export widget of the screen shot 801, as a result, click operation 802 is performed on the Import/Export widget to produce the screen 803.

According to some embodiments, the test action a and test widgets (states) $\pi$ are recognized by Algorithm 1. First, there are three types of test action strokes: action strokes, range strokes and constraint strokes. According to some embodiments, there are two major kinds of test operation: atomic operation and joint operation. Atomic operation represents the atomic test actions expressed by action stokes $\Phi$. For example, click, long-click, drag, etc. Joint operation represents the test actions expressed by the combination of three type strokes. These operations are all from the world outside the SUT.

Figure 10:
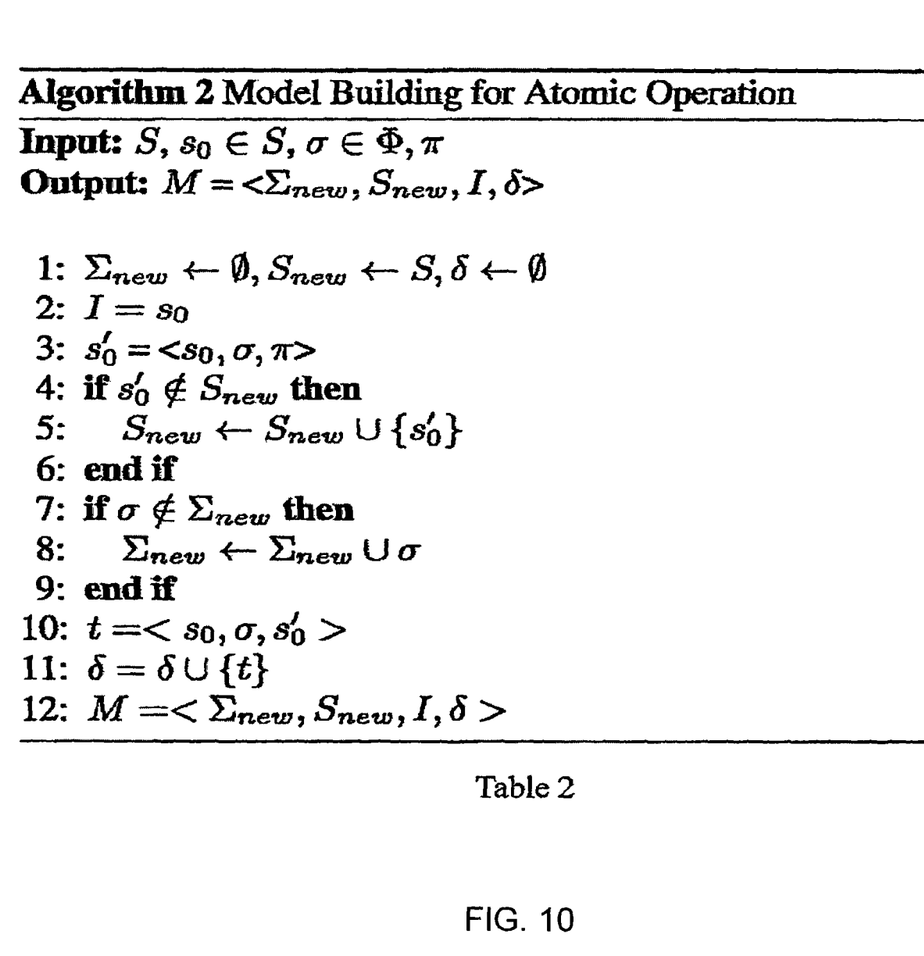
FIG. 10 shows Table 2 that lists Algorithm 2 which is the model building for atomic operation algorithm.

Next, the model is constructed for both operations. According to some embodiments, Algorithm 2 (Table 2) shows how to build a model for atomic operation. The initial state sets S represent all of the screenshots. The initial state s0 represents the interface being tested. The test action $\sigma$ represents concrete atomic test operation. The widget $\pi$ represents test widget. According to some embodiments, they are recognized by Algorithm 1. $M=<\Sigma_{new}, S_{new}, I, \delta>$ stands for the result model that we wanted. $\Sigma_{new}$ represents the test action set, $S_{new}$ represents a state set produced by each execution of testing that contains the new state $s_0'$. A new state may be produced by performing a test action $\sigma$ on a special widget $\pi$ in initial interface $s_0$. The process that adds the new state into state set is called "feedback effect" which will be discussed in more details in the following paragraphs. I is a set which contains all of the initial states. $\delta$ is a collection of transition functions. The transition function is a triplet t<current_state, action, next_state>.

Figure 11:
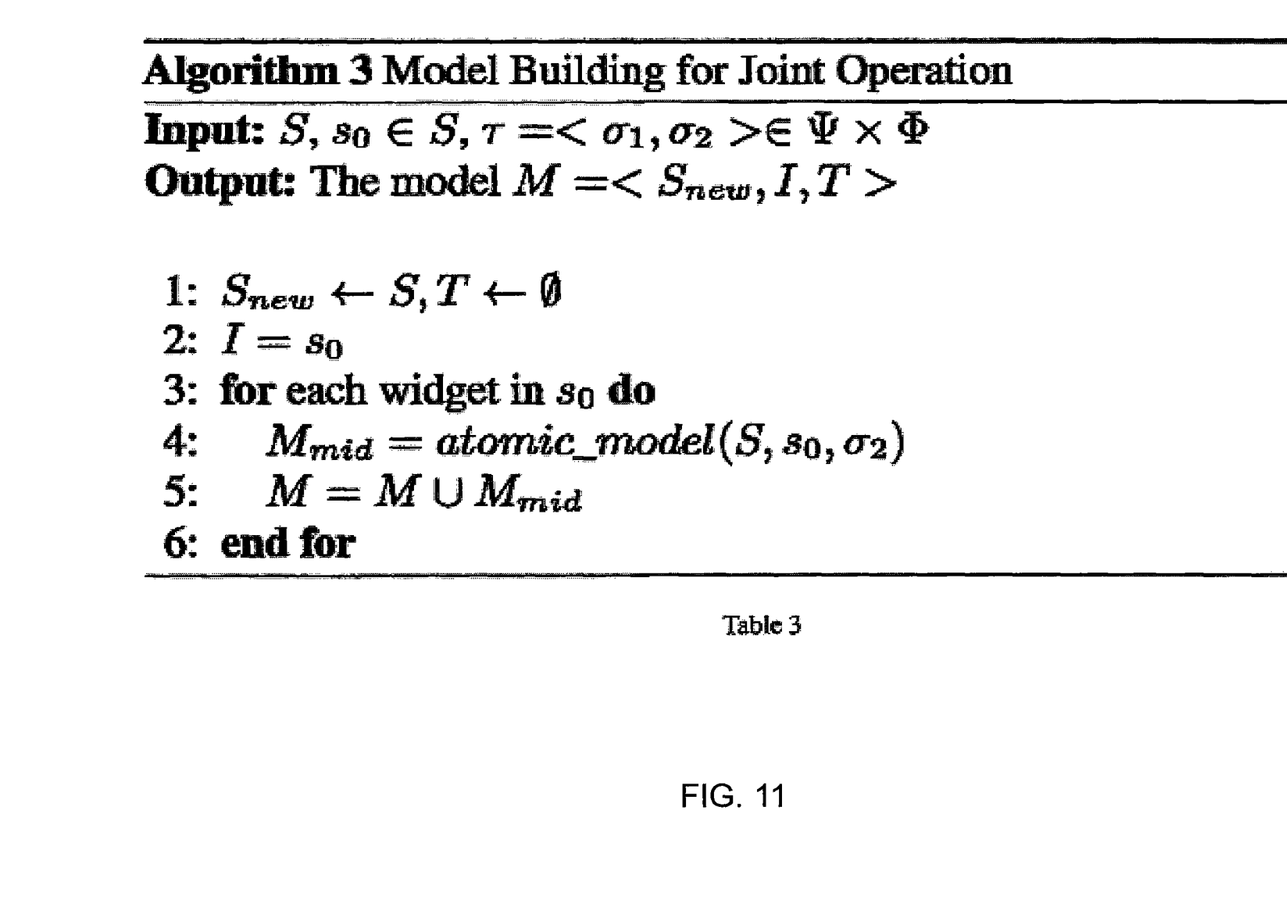
FIG. 11 shows Table 3 that lists Algorithm 3 which is the model building for joint operation algorithm.

Based on the model building algorithm of the atomic operation, Algorithm 3 (Table 3) illustrates how a model for the joint operation is build, with $\tau \in \Psi \times \Phi$. Test cases are generated by combining structural exploration strategy and the corresponding first-order logical constraint.

According to some embodiments, a testing system for testing a touch screen graphical user interface is disclosed. The testing system includes a touch screen for displaying the graphical user interface under test and for receiving a first plurality of touch inputs from at least one user, a first module for recognizing the first plurality of touch inputs received by the touch screen as a second plurality of data structures, a second module for receiving the second plurality of data structures from the first module and constructing at least one test model, a third module for generating a third plurality of test cases based on the at least one test model constructed by the second module, and a fourth module for executing the third plurality of test cases generated by the third module. According to some embodiments, the first plurality of touch inputs includes at least one action stroke. According to some embodiments, the at least one action stroke includes a click operation. According to some embodiments, the at least one action stroke includes a long-click operation. According to some embodiments, the at least one action stroke includes a drag operation. According to some embodiments, the first plurality of touch inputs includes at least one range stroke. According to some embodiments, the at least one range stroke includes a regular curve. According to some embodiments, the at least one range stroke includes an irregular curve. According to some embodiments, the first plurality of touch inputs includes at least one logic stroke. According to some embodiments, the at least one logic stroke includes a forall constraint. According to some embodiments, the at least one logic stroke includes a recursive forall constraint. According to some embodiments, the at least one logic stroke includes a forsome constraint. According to some embodiments, the at least one logic stroke includes an AND. According to some embodiments, the at least one logic stroke includes an OR. According to some embodiments, the at least one logic stroke includes an NOT. According to some embodiments, the at least one test model is image-based logic-related state transition system model. According to some embodiments, the third module generates the third plurality of test cases using depth-first traversal strategy. According to some embodiments, the third module generates the third plurality of test cases using width-first traversal strategy. According to some embodiments, the third module generates the third plurality of test cases using unexplored-first exploration strategy. According to some embodiments, the third module generates the third plurality of test cases using random selection strategy.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A testing system for testing a touch screen graphical user interface, the testing system comprising:
    a touch screen for displaying the graphical user interface under test and for receiving a first plurality of touch inputs from at least one user;
    a sketching and recognition module for recognizing the first plurality of touch inputs received by the touch screen as a first plurality of data structures;
    a model construction module for receiving the first plurality of data structures from the sketching and recognition module and constructing at least one test model;
    a test generation module for generating a first plurality of test cases based on the at least one test model constructed by the model construction module; and a testing and case complement module for executing the first plurality of test cases generated by the test generation module,
wherein the first plurality of touch inputs comprises at least one logic stroke, and
wherein the at least one logic stroke is selected from the group consisting of: a forall constraint, a recursive forall constraint, a forsome constraint, and combinations thereof.

2. The system of claim 1, wherein the first plurality of touch inputs comprises at least one action stroke.

3. The system of claim 2, wherein the at least one action stroke comprises a click operation.

4. The system of claim 2, wherein the at least one action stroke comprises a long-click operation.

5. The system of claim 2, wherein the at least one action stroke comprises a drag operation.

6. The system of claim 1, wherein the first plurality of touch inputs comprises at least one range stroke.

7. The system of claim 6, wherein the at least one range stroke comprises a regular curve.

8. The system of claim 6, wherein the at least one range stroke comprises an irregular curve.

9. The system of claim 1, wherein the at least one test model is image-based logic-related state transition system model.

10. The system of claim 1, wherein the test generation module generates the first plurality of test cases using depth-first traversal strategy.

11. The system of claim 1, wherein the test generation module generates the first plurality of test cases using width-first traversal strategy.

12. A testing system for testing a touch screen graphical user interface, the testing system comprising:
a touch screen for displaying the graphical user interface under test and for receiving a first plurality of touch inputs from at least one user;
a sketching and recognition module for recognizing the first plurality of touch inputs received by the touch screen as a first plurality of data structures;
a model construction module for receiving the first plurality of data structures from the sketching and recognition module and constructing at least one test model;
a test generation module for generating a first plurality of test cases based on the at least one test model constructed by the model construction module; and
a testing and case complement module for executing the first plurality of test cases generated by the test generation module,
wherein the test generation module generates the first plurality of test cases using unexplored-first exploration strategy.

13. The system of claim 1, wherein the test generation module generates the first plurality of test cases using random selection strategy.

14. A testing system for testing a touch screen graphical user interface, the testing system comprising:
a touch screen for displaying the graphical user interface under test and for receiving a first plurality of touch inputs from at least one user;
a sketching and recognition module for recognizing the first plurality of touch inputs received by the touch screen as a first plurality of data structures;
a model construction module for receiving the first plurality of data structures from the sketching and recognition module and constructing at least one test model;
a test generation module for generating a first plurality of test cases based on the at least one test model constructed by the model construction module; and
a testing and case complement module for executing the first plurality of test cases generated by the test generation module,
wherein the first plurality of touch inputs comprises at least one logic stroke, and
wherein the at least one logic stroke is selected from the group consisting of: an AND, an OR, a NOT, and combinations thereof.

15. The system of claim 14, wherein the first plurality of touch inputs comprises at least one action stroke.

16. The system of claim 15, wherein the at least one action stroke is selected from the group consisting of: a click operation, a long click operation, a drag operation, and combinations thereof.

17. The system of claim 14, wherein the first plurality of touch inputs comprises at least one range stroke.

18. The system of claim 17, wherein the at least one range stroke is selected from the group consisting of: a regular curve, an irregular curve, and combinations thereof.

19. The system of claim 14, wherein the at least one test model is image-based logic-related state transition system model.

20. The system of claim 14, wherein the test generation module generates the first plurality of test cases using at least one of depth-first traversal strategy and width-first traversal strategy.

21. The system of claim 14, wherein the test generation module generates the first plurality of test cases using random selection strategy.

22. The system of claim 12, wherein the first plurality of touch inputs comprises at least one action stroke.

23. The system of claim 22, wherein the at least one action stroke is selected from the group consisting of: a click operation, a long click operation, a drag operation, and combinations thereof.

24. The system of claim 12, wherein the first plurality of touch inputs comprises at least one range stroke.

25. The system of claim 24, wherein the at least one range stroke is selected from the group consisting of: a regular curve, an irregular curve, and combinations thereof.

26. The system of claim 12, wherein the at least one test model is image-based logic-related state transition system model.

27. The system of claim 12, wherein the test generation module generates the first plurality of test cases using at least one of depth-first traversal strategy and width-first traversal strategy.

28. The system of claim 12, wherein the test generation module generates the first plurality of test cases using random selection strategy.

* * * * *